(12) United States Patent
Chen et al.

(10) Patent No.: US 7,498,383 B2
(45) Date of Patent: Mar. 3, 2009

(54) LOW GLOSS THERMOPLASTIC COMPOSITION, METHOD OF MAKING, AND ARTICLES FORMED THEREFROM

(75) Inventors: Jing Chen, Shanghai (CN); Theo Hoeks, AS Bergen op Zoom (NL); Xinmin Yang, Shanghai (CN)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 298 days.

(21) Appl. No.: 11/177,123

(22) Filed: Jul. 8, 2005

(65) Prior Publication Data

US 2007/0010635 A1    Jan. 11, 2007

(51) Int. Cl.
*C08L 69/00*  (2006.01)

(52) U.S. Cl. .................. 525/101; 525/92 A; 525/92 E; 525/109; 525/122; 525/464

(58) Field of Classification Search ........................ None
See application file for complete search history.

(56) References Cited

U.S. PATENT DOCUMENTS

| | | | |
|---|---|---|---|
| 4,460,733 A | 7/1984 | Carter, Jr. et al. | |
| 4,885,335 A | 12/1989 | Gallucci et al. | |
| 5,380,795 A * | 1/1995 | Gosens et al. | 525/67 |
| 5,451,632 A * | 9/1995 | Okumura et al. | 524/537 |
| 5,530,062 A | 6/1996 | Bradtke et al. | |
| 5,536,780 A * | 7/1996 | Bhatia et al. | 525/65 |
| 5,580,924 A | 12/1996 | Wildi et al. | |
| 5,770,652 A | 6/1998 | Richards et al. | 525/65 |
| 5,994,442 A | 11/1999 | Fujiguchi et al. | |

FOREIGN PATENT DOCUMENTS

| | | |
|---|---|---|
| EP | 0 283 776 A2 | 3/1988 |
| EP | 0 369 200 | 10/1989 |
| EP | 0 375 940 | 11/1989 |
| EP | 0 381 358 B1 | 1/1990 |
| EP | 0 635 547 | 7/1994 |
| EP | 0716116 A1 | 12/1996 |
| EP | 1331246 A1 | 7/2003 |

OTHER PUBLICATIONS

International Search report for International Application No. PCT/US2006/026439; mailed Jan. 25, 2007; 5 pages.
ASTM D2457-97. Standard Test Method for Specular Gloss of Plastic Films and Solid Plastics. pp. 1-5, May 1997.

* cited by examiner

*Primary Examiner*—David Buttner

(57) ABSTRACT

A thermoplastic composition comprises a polycarbonate, a polysiloxane-polycarbonate, and a gel-type low gloss additive, wherein the 60° gloss is measured to be less than or equal to 90 GU according to ASTM D2457. The thermoplastic composition has excellent impact strength and color capability. A method of making the thermoplastic composition, and an article comprising the thermoplastic composition are also disclosed.

21 Claims, 2 Drawing Sheets

LOW GLOSS THERMOPLASTIC COMPOSITION, METHOD OF MAKING, AND ARTICLES FORMED THEREFROM

BACKGROUND OF THE INVENTION

This disclosure relates to polycarbonate compositions, and in particular to low gloss polycarbonate compositions, methods of manufacture, and uses thereof.

Thermoplastics having a low gloss finish are useful in the manufacture of articles and components for a wide range of applications, from automobile components, to decorative articles, to housings for electronic appliances, such as computers. A low gloss finish for a plastic article can be obtained using different methods. Mechanically texturing a plastic surface has long been used, but this type of surface finish is prone to wear and ultimately increases in gloss with use. Further, mechanical texturing adds processing steps and increases manufacturing costs. Modifications to the moldable thermoplastic composition itself is therefore desirable, whereupon an article can have a low gloss surface immediately after processes such as molding, casting, extruding, or rolling of a suitable low gloss composition. Excellent mechanical properties are also desired in a low gloss thermoplastic composition for use in these applications.

Polycarbonates, which have excellent mechanical properties, can be used in applications as described above. Low gloss finishes for polycarbonates can be attained by adding gloss-reducing fillers and additives such as particulate silica, or resins with gloss reducing functionality; however the usefulness of such blends can be mitigated by reduction in or loss of mechanical properties such as, for example, impact strength and ductility retention.

There accordingly remains a need in the art for low gloss thermoplastic compositions comprising polycarbonates. Desirable features of such materials include both excellent mechanical properties and ease of manufacture. The mechanical properties of the low gloss thermoplastic composition are desirably comparable to those of high gloss polycarbonate.

SUMMARY OF THE INVENTION

The above needs are met by a thermoplastic composition comprising a resin composition comprising polycarbonate, a polysiloxane-polycarbonate, and a gel-type low gloss additive, wherein the 60° gloss is measured to be less than or equal to 90 gloss units (GU) on 3 millimeter color chips, according to ASTM D2457.

In an embodiment, a method of preparing a thermoplastic composition comprises melt-combining a polycarbonate, a polysiloxane-polycarbonate, and a gel-type low gloss additive, to form a resin composition, wherein the melt combining is done at a temperature of 220 to 300° C., and wherein the thermoplastic composition has a 60° gloss measured to be less than or equal to 90 GU on 3 millimeter color chips according to ASTM D2457.

In another embodiment, an article comprises the above-described thermoplastic composition.

The above described and other features are exemplified by the following figures and detailed description.

BRIEF DESCRIPTION OF THE FIGURES

We refer now to the figures, which are meant to be exemplary, not limiting.

DETAILED DESCRIPTION OF THE INVENTION

Figure 1:
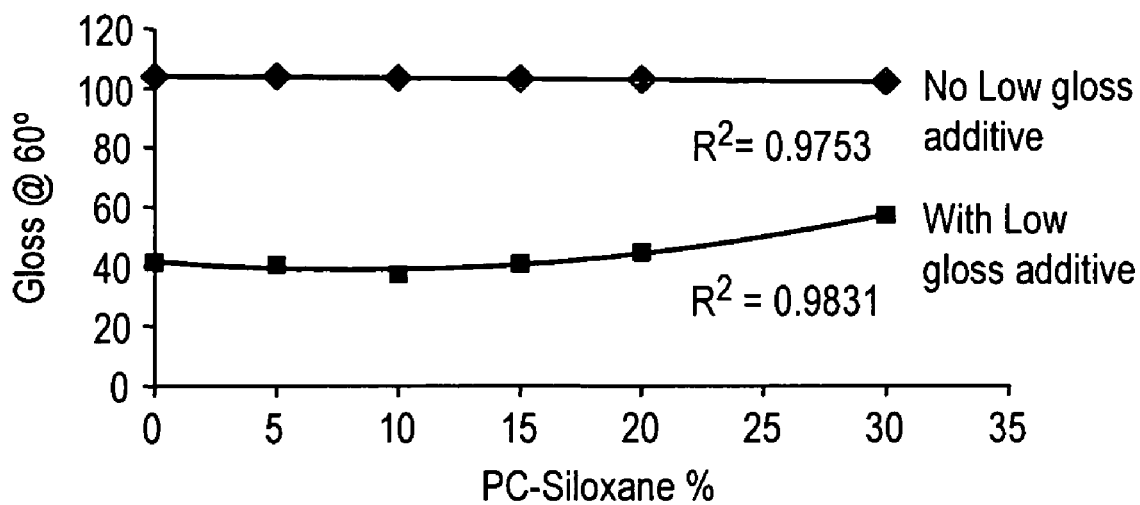
FIG. 1 is a plot of gloss measured at 60° versus loading of polysiloxane-polycarbonate for thermoplastic compositions with and without low gloss additive.

Surprisingly, it has been found that a thermoplastic composition comprising a resin composition comprising a polycarbonate, 5 to 20 weight percent (wt %) of a polysiloxane-polycarbonate, and a gel-type low gloss additive, has excellent mechanical properties, in addition to suitable low gloss performance. Also surprisingly, the addition of polysiloxane-polycarbonate shows minimal effect on the gloss for loadings of up to about 20 wt % of the combined weight percentages of polycarbonate, polysiloxane-polycarbonate, and gel-type low gloss additive.

The resin composition comprises a polycarbonate. As used herein, the terms "polycarbonate" and "polycarbonate resin" means compositions having repeating structural carbonate units of the formula (1):

in which at least 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

$$-A^1-Y^1-A^2- \qquad (2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, which includes dihydroxy compounds of formula (3)

$$HO-A^1-Y^1-A^2-OH \qquad (3)$$

wherein $Y^1$, $A^1$ and $A^2$ are as described above. Also included are bisphenol compounds of general formula (4):

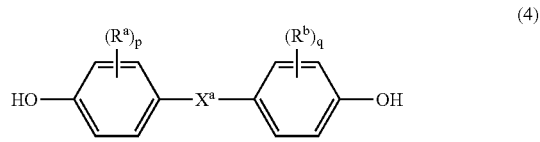

wherein $R^a$ and $R^b$ each represent a halogen atom or a monovalent hydrocarbon group and may be the same or different; p and q are each independently integers of 0 to 4; and $X^a$ represents one of the groups of formula (5):

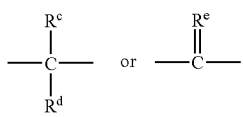

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxy-3 methyl phenyl)cyclohexane 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl) propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds that may be represented by formula (3) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl) propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethyl benzyl)phenol), 4-chloroformyl phthalic anhydride, trimesic acid, and benzophenone tetracarboxylic acid. The branching agents may be added at a level of 0.05 to 2.0 wt %. All types of polycarbonate end groups are contemplated as being useful in the polycarbonate composition, provided that such end groups do not significantly affect desired properties of the thermoplastic compositions.

In one specific embodiment, the polycarbonate is a linear homopolymer derived from bisphenol A, in which each of $A^1$ and $A^2$ is p-phenylene and $Y^1$ is isopropylidene. The polycarbonates may have an intrinsic viscosity, as determined in chloroform at 25° C., of 0.3 to 1.5 deciliters per gram (dl/g), specifically 0.45 to 1.0 dl/g. The polycarbonates may have a weight average molecular weight of 10,000 to 100,000, specifically 15,000 to 50,000 as measured by gel permeation chromatography using a crosslinked styrene-divinyl benzene column, at a sample concentration of 1 milligram per milliliter, and as calibrated with polystyrene standards.

In one embodiment, the polycarbonate has flow properties suitable for the manufacture of thin articles. Melt volume flow rate (often abbreviated MVR) measures the rate of extrusion of a thermoplastics through an orifice at a prescribed temperature and load. Polycarbonates suitable for the formation of thin articles may have an MVR, measured at 300 ° C./1.2 kg, of 1 to 35 cubic centimeters per 10 minutes (cc/10 min), specifically 2 to 30 cc/10 min. Mixtures of polycarbonates of different flow properties may be used to achieve the overall desired flow property. The polycarbonate may have a light transmission greater than or equal to 55%, specifically greater than or equal to 60% and more specifically greater than or equal to 70%, as measured according to ASTM D1003-00. The copolymer has a haze less than or equal to 50%, specifically less than or equal to 40%, and most specifically less than or equal to 30%, as measured according to ASTM D1003-00.

"Polycarbonates" and "polycarbonate resin" as used herein may further include blends of polycarbonates with other copolymers comprising carbonate chain units. A specific suitable copolymer is a polyester carbonate, also known as a copolyester-polycarbonate. Such copolymers further contain, in addition to recurring carbonate chain units of the formula (1), repeating units of formula (6):

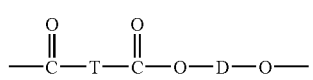

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

(7)

wherein each $R^f$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalene-dicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is 91:1 to 2:98. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In addition to the ester units, the polyester polycarbonates can comprise carbonate units as described hereinabove. Carbonate units of formula (1) may also be derived from aromatic dihydroxy compounds of formula (7), wherein specific carbonate units are resorcinol carbonate units.

Specifically, the polyester unit of a polyester-polycarbonate can be derived from the reaction of a combination of isophthalic and terephthalic diacids (or derivatives thereof) with resorcinol, bisphenol A, or a combination comprising one or more of these, wherein the molar ratio of isophthalate units to terephthalate units is 91:9 to 2:98, specifically 85:15 to 3:97, more specifically 80:20 to 5:95, and still more specifically 70:30 to 10:90. The polycarbonate units can be derived from resorcinol and/or bisphenol A, in a molar ratio of resorcinol carbonate units to bisphenol A carbonate units of 0:100 to 99:1, and the molar ratio of the mixed isophthalate-terephthalate polyester units to the polycarbonate units in the polyester-polycarbonate can be 1:99 to 99:1, specifically 5:95 to 90:10, more specifically 10:90 to 80:20. Where a blend of polyester-polycarbonate with polycarbonate is used, the ratio of polycarbonate to polyester-polycarbonate in the blend can be, respectively, 1:99 to 99:1, specifically 10:90 to 90:10.

The polyester-polycarbonates may have a weight-averaged molecular weight (Mw) of 1,500 to 30,000, specifically 1,700 to 20,000, and more specifically 2,000 to 10,000. Molecular weight determinations are performed using gel permeation chromatography (GPC), using a crosslinked styrene-divinyl-benzene column and calibrated to polystyrene references. Samples are prepared at a concentration of about 1 mg/ml, and are eluted at a flow rate of about 1.0 ml/min.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., 8 to 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst may be 0.1 to 10 wt % based on the weight of bisphenol in the phosgenation mixture. In another embodiment an effective amount of phase transfer catalyst may be 0.5 to 2 wt % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

Polyester-polycarbonate resins may also be prepared by interfacial polymerization. Rather than utilizing the dicarboxylic acid per se, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, or mixtures thereof, it is possible to employ isophthaloyl dichloride, terephthaloyl dichloride, and mixtures thereof.

In addition to the polycarbonates described above, it is also possible to use combinations of the polycarbonate with other thermoplastic polymers, for example combinations of polycarbonates and/or polycarbonate copolymers with polyesters. As used herein, a "combination" is inclusive of all mixtures, blends, alloys, reaction products, and the like. Suitable polyesters comprise repeating units of formula (6), and may be, for example, poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

An example of a polyester which can be useful includes poly(alkylene terephthalates). Specific examples of poly (alkylene terephthalates) include, but are not limited to, poly (ethylene terephthalate) (PET), poly(1,4-butylene terephthalate) (PBT), poly(ethylene naphthanoate) (PEN), poly (butylene naphthanoate), (PBN), (polypropylene terephthalate) (PPT), polycyclohexanedimethanol terephthalate (PCT), and combinations comprising at least one of the foregoing polyesters. Also contemplated are the above polyesters with a minor amount, e.g., from 0.5 to 10 percent by weight, of units derived from an aliphatic diacid and/or an aliphatic polyol to make copolyesters.

Polycarbonate is thus present in the resin composition in an amount of 50 to 98 wt %, 60 to 94 wt %, specifically 65 to 93 wt %, more specifically 78 to 91 wt %, and still more specifically 83 to 90 wt %, of the combined weights of the polycarbonate, polysiloxane-polycarbonate, and gel-type low gloss additive.

The resin composition further comprises a polysiloxane-polycarbonate copolymer. The polysiloxane (also referred to herein as "polydiorganosiloxane") blocks of the copolymer comprise repeating polydiorganosiloxane units of formula (8):

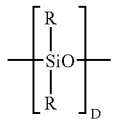

(8)

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. The foregoing groups may be fully or partially halogenated with fluorine, chlorine, bromine, or iodine, or a combination thereof. Combinations of the foregoing R groups may be used in the same copolymer.

The value of D in formula (8) may vary widely depending on the type and relative amount of each component in the thermoplastic composition, the desired properties of the composition, and like considerations. Generally, D may have an average value of 2 to 1,000, specifically 2 to 500, and more specifically 5 to 100. In one embodiment, D has an average value of 10 to 75, and in still another embodiment, D has an average value of 40 to 60. Where D is of a lower value, e.g., less than 40, it may be desirable to use a relatively larger amount of the polycarbonate-polysiloxane copolymer. Conversely, where D is of a higher value, e.g., greater than 40, it may be necessary to use a relatively lower amount of the polycarbonate-polysiloxane copolymer.

A combination of a first and a second (or more) polysiloxane-polycarbonate copolymers may be used, wherein the average value of D of the first copolymer is less than the average value of D of the second copolymer.

In one embodiment, the polydiorganosiloxane blocks are provided by repeating structural units of formula (9):

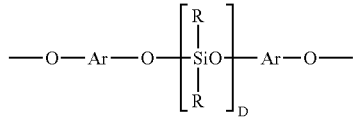

(9)

wherein D is as defined above; each R may be the same or different, and is as defined above; and each Ar may be the same or different, and is a substituted or unsubstituted $C_6$-$C_{30}$ arylene radical, wherein the bonds are directly connected to an aromatic moiety. Suitable Ar groups in formula (9) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarlyene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis (4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Such units may be derived from the corresponding dihydroxy compound of formula (10):

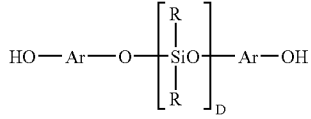

(10)

wherein R, Ar, and D are as described above. Compounds of formula (10) may be obtained by the reaction of a dihydroxyarylene compound with, for example, an alpha, omega-bisacetoxypolydiorangonosiloxane under phase transfer conditions.

In another embodiment, polydiorganosiloxane blocks comprises units of formula (11):

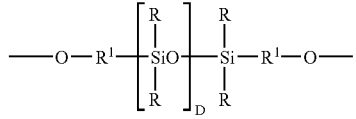

(11)

wherein R and D are as described above, and each occurrence of $R^1$ is independently a divalent $C_1$-$C_{30}$ alkylene, and wherein the polymerized polysiloxane unit is the reaction residue of its corresponding dihydroxy compound. In a specific embodiment, the polydiorganosiloxane blocks are provided by repeating structural units of formula (12):

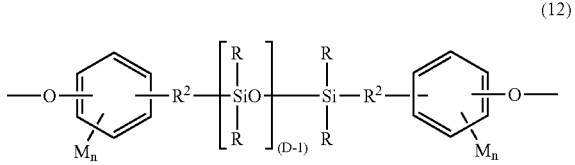

wherein R and D are as defined above. Each $R^2$ in formula (12) is a divalent $C_2$-$C_8$ aliphatic group. Each M in formula (12) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

Units of formula (12) may be derived from the corresponding dihydroxy polydiorganosiloxane (13):

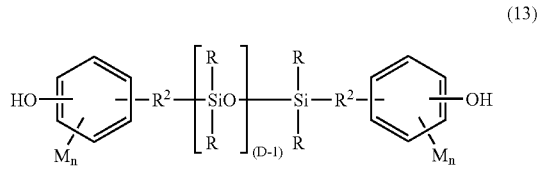

wherein R, D, M, $R^2$, and n are as described above. Such dihydroxy polysiloxanes can be made by effecting a platinum catalyzed addition between a siloxane hydride of formula (14):

wherein R and D are as previously defined, and an aliphatically unsaturated monohydric phenol. Suitable aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The polysiloxane-polycarbonate comprises 50 to 99 wt % of carbonate units and 1 to 50 wt % dimethylsiloxane units, or the molar equivalent of other diorganosiloxane units. Within this range, the polysiloxane-polycarbonate copolymer may comprise 70 to 98 wt %, specifically 75 to 97 wt % of carbonate units and 2 to 30 wt %, specifically 3 to 25 wt % dimethylsiloxane units, or the molar equivalent of other diorganosiloxane units.

The polysiloxane-polycarbonate copolymer may have a light transmission greater than or equal to 55%, specifically greater than or equal to 60% and more specifically greater than or equal to 70%, as measured according to ASTM D1003-00. The copolymer may have a haze less than or equal to 50%, specifically less than or equal to 40%, and most specifically less than or equal to 30%, as measured according to ASTM D1003-00.

In one specific embodiment, the polysiloxane-polycarbonate comprises polysiloxane units, and carbonate units derived from bisphenol A, i.e., the dihydroxy compound of formula (3) in which each of $A^1$ and $A^2$ is p-phenylene and $Y^1$ is isopropylidene. Polysiloxane-polycarbonates may have a weight average molecular weight of 2,000 to 100,000, specifically 5,000 to 50,000 as measured by gel permeation chromatography using a crosslinked styrene-divinyl benzene column, at a sample concentration of 1 milligram per milliliter, and as calibrated with polystyrene standards.

In one embodiment, the polysiloxane-polycarbonate can have a melt volume flow rate, measured at 300° C./1.2 kg, of 1 to 35 cubic centimeters per 10 minutes (cc/10 min), specifically 2 to 30 cc/10 min. Mixtures of polysiloxane-polycarbonates of different flow properties may be used to achieve the overall desired flow property.

The resin composition comprises a polysiloxane-polycarbonate in an amount effective to maintain at least one mechanical property of the thermoplastic composition prepared therefrom, in the presence of further components. Polysiloxane-polycarbonate is thus present in the resin composition in an amount of 5 to 20 wt %, specifically 5 to 15 wt %, more specifically 6 to 15 wt %, and still more specifically 7 to 10 wt %, of the combined weights of the polycarbonate, polysiloxane-polycarbonate, and gel-type low gloss additive.

The polysiloxane content of the resin composition, as provided by the polysiloxane-polycarbonate present therein, can thus be present in an amount of 1 to 4 wt %, specifically 1 to 3 wt %, more specifically 1.2 to 3 wt %, and still more specifically 1.4 to 2 wt % of the total weight of the resin composition.

The resin composition used in the thermoplastic composition further comprises a gel-type low gloss additive. The gel-type low gloss additive comprises the reaction product of a polyepoxide and a polymer comprising an ethylenically unsaturated nitrile, and can further comprise a polycarbonate. The components are reactively combined at elevated temperature to form the gel-type low gloss additive. Suitable gel-type low gloss additives and methods of preparing them are disclosed in U.S. Pat. No. 5,530,062 to Bradtke, which is incorporated herein by reference.

Polyepoxides which are suitable for use in preparing gel-type low gloss additives include simple aliphatic diepoxides such as dodecatriene dioxide, dipentene dioxide and 1,2,7,8-diepoxyoctane; bis-glycidyl ethers/esters such as the bisglycidyl ether of bisphenol A and its condensation products; alicyclic diepoxides such as 3,4-epoxycyclohexyl 3,4-epoxycyclohexanecarboxylate and bis(3,4-epoxycyclohexylmethyl)adipate; mixed aliphatic/alicyclic diepoxides such as vinylcyclobutene dioxide, vinylcyclopentadiene dioxide and butenylcyclopentene dioxide; glycidyl ethers of novolak resins; epoxidized heterocycles such as triglycidyl isocyanurate; and epoxidized oils such as epoxidized tall oil, linseed oil and soybean oil; combinations comprising one or more of the foregoing; and the like. Specifically suitable polyepoxides are alicyclic polyepoxides such as 3,4-epoxycyclohexyl 3,4-epoxycyclohexylcarboxylate, available under the trade name ERL-4221 from Union Carbide.

Also employed is at least one addition polymer containing structural units derived from at least one ethylenically unsaturated nitrile such as acrylonitrile, methacrylonitrile or fumaronitrile. Acrylonitrile is specifically useful, as are copolymers in which at least some of the other units are derived from a vinylaromatic compound. Suitable copolymers of this type include styrene-acrylonitrile copolymers, α-methylstyrene-acrylonitrile copolymers, acrylonitrile-styrene-methacrylic acid ester terpolymers, acrylonitrile-butadiene-styrene (ABS) resins, acrylonitrile-ethyl acrylate-styrene copolymers and rubber-modified acrylonitrile-styrene-butyl acrylate polymers.

Styrene-acrylonitrile (SAN) copolymers are specifically useful. Suitable SAN copolymers comprise at least 5 wt %, specifically 15 to 35 wt % ethylenically unsaturated nitrile units. More specifically, a SAN copolymer comprises about 75 wt % styrene and about 25 wt % acrylonitrile units irrespective of the monomer proportions in the copolymerization mixture, and those are therefore the proportions most often used. The weight average molecular weight of the addition polymer, as determined by gel permeation chromatography relative to polystyrene standards, is typically about 30,000 to about 150,000.

A polycarbonate as described above can be added to the gel-type low gloss additive. Specifically, a suitable polycarbonate is derived from 2,2-bis(4-hydroxyphenyl)propane, e.g. bisphenol A. The weight averaged molecular weight, as determined by gel permeation chromatography relative to polystyrene standards, of a suitable polycarbonate is generally 10,000 to 100,000.

The polyepoxide and ethylenically unsaturated nitrile containing copolymer are melt blended to react them in batch or continuous mode. Typically, the polymers are extruded to form the gel-type low gloss additive. An epoxide ring-opening catalyst, typically a sulfonic acid such as dodecylbenzenesulfonic acid, is added to the feedthroat of an extruder concurrently with the polyepoxide and ethylenically unsaturated nitrile containing polymer. The polyepoxide is present in an amount of 1.5 to 6.0 wt %, and catalyst is present at about 800 to 1800 ppm relative to the amount of ethylenically unsaturated nitrile containing copolymer. Water may also be introduced in an amount of 0.05 to 1.0 wt % relative to the ethylenically unsaturated nitrile containing copolymer. Extrusion of the polymers is typically carried out using a twin screw extruder operating at a temperature of 220 to 300° C., and the resulting reaction product is obtained as a gel.

The gel is melt blended, at a temperature of up to 350° C., with a polycarbonate during preparation of the gel-type low gloss additive to facilitate the production of a strandable product with minimum energy input. The gloss reducing efficiency of the gel is also improved when blended with a polycarbonate to form the gel-type low gloss additive, and therefore less of the gel is needed to produce an equivalent reduction in gloss. The gel-type low gloss additive comprises 25 to 75 wt % polycarbonate and 75 to 25 wt % of the gel comprising the co-reacted polyepoxide and ethylenically unsaturated nitrile containing copolymer. In a specific embodiment, the polyepoxide and ethylenically unsaturated nitrile containing copolymer are combined with an initial portion of polycarbonate used to form the gel-type low gloss additive, and fed into the feedthroat of an extruder, and the remaining portion of the polycarbonate used to form the gel-type low gloss additive is added using a downstream feedport of the extruder. In a specific embodiment, a first portion of 20 to 60 wt % of the polycarbonate used to form the gel-type low gloss additive is added to the feedthroat of the extruder with the polyepoxide and ethylenically unsaturated nitrile containing polymer, and a second portion comprising 80 to 20 wt % of the polycarbonate used to form the gel-type low gloss additive (i.e., the balance of the polycarbonate used to form the gel-type low gloss additive), is added to the feedport of the extruder.

The thermoplastic composition thus comprises a resin composition comprising the gel-type low gloss additive, the polycarbonate, and the polysiloxane-polycarbonate. The gel-type low gloss additive is present in the resin composition in an amount of 1 to 20 wt %, specifically 2 to 10 wt %, and more specifically 3 to 7 wt % of the combined weights of the polycarbonate, polysiloxane-polycarbonate, and gel-type low gloss additive.

It has been observed that a combination of a polycarbonate and the above described gel-type low gloss additive can provide low gloss performance, where the gel-type low gloss additive is present in an amount of less than 20 weight percent, but can also reduce the resultant mechanical properties of such a combination. Without being bound by theory, it is believed that the polycarbonate and gel-type low gloss additive are immiscible polymers, such that the gels of the gel-type low gloss additive do not substantially interact with the polycarbonate, i.e., the strength of the interaction of the polycarbonate toward itself is greater than the strength of interaction between the gel and the polycarbonate. It is believed that the gels can form isolated regions within the polycarbonate that do not act to reinforce the mechanical properties of the polycarbonate, and further can act to weaken them.

The surface gloss of the thermoplastic composition, measured at an angle of 60 degrees (°) on 3 mm colored chips, is less than or equal to 90 gloss units (GU), specifically less than or equal to 70 GU, still more specifically less than or equal to 60 GU, still more specifically less than or equal to 50 GU, and still more specifically less than or equal to 40 GU.

The mechanical properties of the thermoplastic composition can be measured using impact strength. Notched izod impact strength for the thermoplastic composition, is 650 to 1000 joules per meter (J/m), specifically 750 to 975 J/m, more specifically 800 to 950 J/m, as measured at 23° C. on 3.12 mm molded bars using the method of ASTM D1238-04. The % ductility measured for the thermoplastic composition is greater than or equal to 80%, specifically greater than or equal to 85%, and more specifically greater than or equal to 90%, as measured at 23° C. on 3.12 mm molded bars using the method of ASTM D1238-04.

It has also been observed that the addition of impact modifiers, such as, for example, acrylonitrile-butadiene-styrene (ABS) or methyl methacrylate-butadiene-styrene (MBS) terpolymers, to compositions including polycarbonates and gel-type low gloss additive, can increase the measured gloss of the composition. The 60° gloss has been observed to increase linearly with increasing loadings of impact modifiers, and may lead to increases of greater than 40 GU in gloss as the loading is increased to loadings of 30 wt % of the combined weight of copolymer, polycarbonate, and gel-type low gloss additive. This can lead to excessively high gloss values at impact modifier loadings which provide desirable mechanical properties (such as, for example, impact strength).

Surprisingly it has been found that addition of a polysiloxane-polycarbonate to the combination of a polycarbonate and a gel-type low gloss additive provides a resin composition which, when used in a thermoplastic composition, provides a low surface gloss in the thermoplastic composition, while maintaining or improving one or more of the mechanical properties of the polycarbonate without the gel-type low gloss additive present. Also surprisingly, it has been found that loadings of polysiloxane-polycarbonate of up to about 20 wt % in the resin composition and at a constant loading of the gel-type low gloss additive, provide gloss values in a thermoplastic composition prepared therewith that do not respond linearly to, but remain substantially constant with, increasing loadings of polysiloxane-polycarbonate. As disclosed herein, the term "substantially constant" applies when the measured difference in gloss is minimal between any two thermoplastic compositions, prepared using different resin compositions having different loadings of polysiloxane-polycarbonate and having the same loading of gel-type low gloss additive, but which are otherwise identical. The 60° gloss of any two such thermoplastic compositions can differ by less than or equal to 12 GU, specifically less than or equal to 10 GU, and more specifically less than or equal to 8 GU. Gloss is 60° gloss determined according to ASTM D2457.

In addition to the resin composition, the thermoplastic composition can include various additives ordinarily incorporated with resin compositions of this type, with the proviso that the additives are selected so as not to adversely affect the desired properties of the thermoplastic composition. Mixtures of additives may be used. Such additives may be mixed at a suitable time during the mixing of the components for forming the thermoplastic composition.

The thermoplastic composition may comprise a colorant such as a pigment and/or dye additive. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates, sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments can be used in amounts of 0.01 to 10 percent by weight, based on 100 percent by weight of the resin composition, excluding any other additives and/or fillers.

Suitable dyes can be organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$)olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Dyes can be used in amounts of 0.01 to 10 percent by weight, based on 100 percent by weight of the resin composition, excluding any other additives and/or fillers.

It has been observed that thermoplastic compositions comprising nitrile containing polymers, such as, but not limited to, ABS resins, can have a yellow color which is observable both spectrophotometrically and visually in the absence of an added colorant. The presence of this baseline color can inhibit attaining high quality colors, specifically high quality light colors.

It has been observed that the resin composition comprising the polycarbonate, polysiloxane-polycarbonate, and the gel-type low gloss additive has low intrinsic (i.e., baseline) color. Thus, where addition of a colorant is useful, the colored thermoplastic composition so prepared has excellent color capability. In an embodiment, the low intrinsic color of the thermoplastic composition provides excellent color capability wherein a super white color performance is desired. As used herein, the term "super white" is a high grade white color which transmits the full whiteness of a white pigment without additional colors and/or tints and/or shading to cast added colors and/or hues to the appearance of the white pigment, as dispersed in the thermoplastic composition. In a specific embodiment, a super white color is obtained using a white pigment. In further specific embodiment, the white pigment is titanium dioxide. In another embodiment, the low intrinsic color of the thermoplastic composition provides excellent color capability wherein a non-white pigment is used.

The color capability of the thermoplastic composition can be determined spectrophotometrically against a standard composition comprising the same color composition in the same concentration, and classified according to the CEELAB color measurement method detailed by CIE (Commission Internationale de l'Eclairage). The values of E*, L*, a* and b*, used to describe the color space of a test material, are related by the formula:

$$\Delta E^*_{ab} = [(\Delta L^*)^2 + (\Delta a^*)^2 + (\Delta b^*)^2]^{0.5}.$$

In this equation, L* represents the difference between light (L*=100) and dark (L*=0). The value a* represents the difference between green (−a*) and red (+a*), and b* represents the difference between yellow (+b*) and blue (−b*). The value of each parameter represents the magnitude of the difference in color. The net deviation for color capability is given by the overall deviation value E*, which is the Euclidean distance between two points in a three dimensional space. Thus, the separation between points a* and b*, and therefore the net deviation from the standard color, is given by the overall deviation value $\Delta E^*_{ab}$.

In an embodiment, the color capability of the thermoplastic composition, as determined spectrophotometrically using the method of CIELAB, has a deviation of less than or equal to 0.5, specifically less than or equal to 0.45, specifically less than or equal to 0.4 for the overall deviation value $\Delta E^*_{ab}$.

The thermoplastic composition may include an impact modifier to increase its impact resistance, where the impact modifier is present in an amount that does not adversely affect the desired properties of the thermoplastic composition. These impact modifiers include elastomer-modified graft copolymers comprising (i) an elastomeric (i.e., rubbery) polymer substrate having a Tg less than 10° C., more specifically less than −10° C., or more specifically −40° to −80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than 50 wt % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers.

Suitable conjugated diene monomers for preparing the elastomer phase are of formula (15):

(15)

wherein each $X^b$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, or monomers of formula (16):

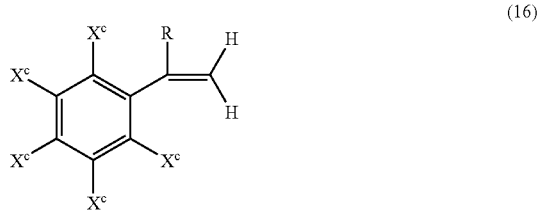

(16)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers of the generic formula (17):

(17)

wherein R is hydrogen, $C_1$-$C_5$ alkyl, bromo, or chloro, and $X^c$ is $C_1$-$C_{12}$ alkoxycarbonyl, $C_1$-$C_{12}$ aryloxycarbonyl, hydroxy carbonyl, or the like. Examples of monomers of formula (17) include, acrylic acid, methyl(meth)acrylate, ethyl(meth)acrylate, n-butyl(meth)acrylate, t-butyl(meth)acrylate, n-propyl (meth)acrylate, isopropyl(meth)acrylate, 2-ethylhexyl(meth) acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

Suitable (meth)acrylate monomers suitable for use as the elastomeric phase may be cross-linked, particulate emulsion homopolymers or copolymers of $C_{1-8}$ alkyl(meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl(meth)acrylate monomers may optionally be polymerized in admixture with up to 15 wt % of comonomers of formulas (15), (16), or (17). Exemplary comonomers include but are not limited to butadiene, isoprene, styrene, methyl methacrylate, phenyl methacrylate, penethylmethacrylate, N-cyclohexylacrylamide, vinyl methyl ether, and mixtures comprising at least one of the foregoing comonomers. Optionally, up to 5 wt % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of 0.001 to 25 micrometers, specifically 0.01 to 15 micrometers, or even more specifically 0.1 to 8 micrometers may be used for emulsion based polymerized rubber lattices. A particle size of 0.5 to 10 micrometers, specifically 0.6 to 1.5 micrometers may be used for bulk polymerized rubber substrates. Particle size may be measured by simple light transmission methods or capillary hydrodynamic chromatography (CHDF). The elastomer phase may be a particulate, moderately cross-linked conjugated butadiene or $C_{4-6}$ alkyl acrylate rubber, and preferably has a gel content greater than 70 wt %. Also suitable are mixtures of butadiene with styrene and/or $C_{4-6}$ alkyl acrylate rubbers.

The elastomeric phase may provide 5 to 95 wt % of the total graft copolymer, more specifically 20 to 90 wt %, and even more specifically 40 to 85 wt % of the elastomer-modified graft copolymer, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above-described monovinylaromatic monomers of formula (16) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Suitable comonomers include, for example, the above-described monovinylic monomers and/or monomers of the general formula (17). In one embodiment, R is hydrogen or $C_1$-$C_2$ alkyl, and $X^c$ is cyano or $C_1$-$C_{12}$ alkoxycarbonyl. Specific examples of suitable comonomers for use in the rigid phase include, methyl (meth)acrylate, ethyl(meth)acrylate, n-propyl(meth)acrylate, isopropyl(meth)acrylate, and the like, and combinations comprising at least one of the foregoing comonomers.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may generally comprise up to 100 wt % of monovinyl aromatic monomer, specifically 30 to 100 wt %, more specifically 50 to 90 wt % monovinylaromatic monomer, with the balance being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise 40 to 95 wt % elastomer-modified graft copolymer and 5 to 65 wt % graft (co)polymer, based on the total weight of the impact modifier. In another embodiment, such impact modifiers comprise 50 to 85 wt %, more specifically 75 to 85 wt % rubber-modified graft copolymer, together with 15 to 50 wt %, more specifically 15 to 25 wt % graft (co)polymer, based on the total weight of the impact modifier.

Another specific type of elastomer-modified impact modifier comprises structural units derived from at least one silicone rubber monomer, a branched acrylate rubber monomer having the formula $H_2C=C(d)C(O)OCH_2CH_2R^e$, wherein $R^d$ is hydrogen or a $C_1$-$C_8$ linear or branched alkyl group and $R^e$ is a branched $C_3$-$C_{16}$ alkyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable, alkenyl-containing organic material may be, for example, a monomer of formula (16) or (17), e.g., styrene, alpha-methylstyrene, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl) (dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from 30° C. to 110° C. to form a silicone rubber latex, in the presence of a surfactant such as dodecylbenzenesulfonic acid. Alternatively, a cyclic siloxane such as cyclooctamethyltetrasiloxane and tetraethoxyorthosilicate may be reacted with a first graft link monomer such as (gamma-methacryloxypropyl) methyldimethoxysilane, to afford silicone rubber having an average particle size from 100 nanometers to 2 micrometers. At least one branched acrylate rubber monomer is then polymerized with the silicone rubber particles, optionally in presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from 100 nanometers to 2 micrometers 2 micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

The foregoing types of impact modifiers can be prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof. A specific surfactant is a $C_{6-16}$, specifically a $C_{8-12}$ alkyl sulfonate. In the practice, any of the above-described impact modifiers may be used providing it is free of the alkali metal salts of fatty acids, alkali metal carbonates and other basic materials.

A specific impact modifier of this type is an MBS impact modifier wherein the butadiene substrate is prepared using above-described sulfonates, sulfates, or phosphates as surfactants. It is also preferred that the impact modifier have a pH of 3 to 8, specifically 4 to 7. When present, impact modifiers can be present in amounts of 0.1 to 30 percent by weight, based on 100 percent by weight of the resin composition, excluding any other additives and/or fillers.

The thermoplastic composition may include fillers or reinforcing agents. Where used, suitable fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boronnitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly (vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers can be used in amounts of 0 to 90 percent by weight, based on 100 percent by weight of the resin composition, excluding any other additives and/or fillers.

Suitable antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of paracresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants can be used in amounts of 0.0001 to 1 percent by weight, based on 100 percent by weight of the resin composition, excluding any other additives and/or fillers.

Suitable heat stabilizer additives include, for example, organophosphites such as triphenyl phosphite, tris-(2,6-dimethylphenyl)phosphite, tris-(mixed mono-and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers can be used in amounts of 0.0001 to 1 percent by weight, based on 100 percent by weight of the resin composition, excluding any other additives and/or fillers.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers can be used in amounts of 0.0001 to 1 percent by weight, based on 100 percent by weight of the resin composition, excluding any other additives and/or fillers.

Suitable UV absorbing additives include for example, hydroxybenzophenones; hydroxybenzotriazoles; hydroxybenzotriazines; cyanoacrylates; oxanilides; benzoxazinones;

2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene) bis (4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations comprising at least one of the foregoing UV absorbers. UV absorbers can be used in amounts of 0.0001 to 1 percent by weight, based on 100 percent by weight of the resin composition, excluding any other additives and/or fillers.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials can be used in amounts of 0.0001 to 1 percent by weight, based on 100 percent by weight of the resin composition, excluding any other additives and/or fillers.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example Pelestat™ 6321 (Sanyo) or Pebax™ MH1657 (Atofina), Irgastat™ P18 and P22 (Ciba-Geigy). Other polymeric materials that may be used as antistatic agents are inherently conducting polymers such as polyaniline (commercially available as PANIPOLE® from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents can be used in amounts of 0.0001 to 5 percent by weight, based on 100 percent by weight of the resin composition, excluding any other additives and/or fillers.

Suitable flame retardant that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate. Other suitable aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis (2-ethylhexyl)p-tolyl phosphate, tritolyl phosphate, bis(2-ethylhexyl)phenyl phosphate, tri(nonylphenyl)phosphate, bis (dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

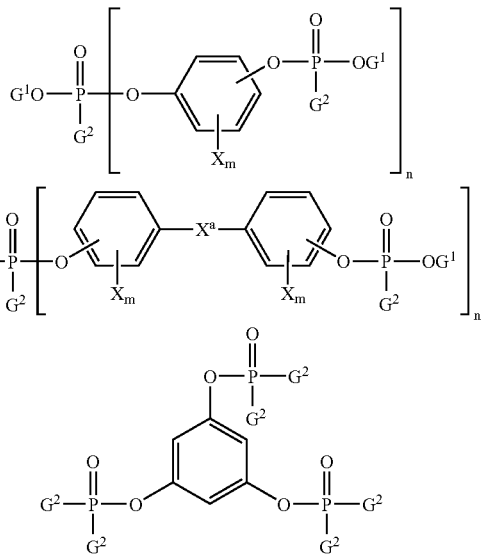

wherein each $G^1$ is independently a hydrocarbon having 1 to 30 carbon atoms; each $G^2$ is independently a hydrocarbon or hydrocarbonoxy having 1 to 30 carbon atoms; each $X^a$ is independently a hydrocarbon having 1 to 30 carbon atoms;

each X is independently a bromine or chlorine; m is 0 to 4, and n is 1 to 30. Examples of suitable di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A, respectively, their oligomeric and polymeric counterparts, and the like.

Exemplary suitable flame retardant compounds containing phosphorus-nitrogen bonds include phosphonitrilic chloride, phosphorus ester amides, phosphoric acid amides, phosphonic acid amides, phosphinic acid amides, tris(aziridinyl)phosphine oxide. When present, phosphorus-containing flame retardants can be present in amounts of 0.1 to 10 percent by weight, based on 100 percent by weight of the resin composition, excluding any other additives and/or fillers.

Halogenated materials may also be used as flame retardants, for example halogenated compounds and resins of formula (18):

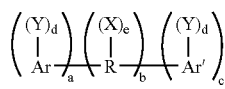

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (18) are each independently mono- or polycarbocyclic aromatic groups such as phenylene, biphenylene, terphenylene, naphthylene, or the like.

Y is an organic, inorganic, or organometallic radical, for example: halogen, e.g., chlorine, bromine, iodine, fluorine; ether groups of the general formula OE, wherein E is a monovalent hydrocarbon radical similar to X; monovalent hydrocarbon groups of the type represented by R; or other substituents, e.g., nitro, cyano, and the like, said substituents being essentially inert provided that there is at least one and preferably two halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group may itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar', can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen containing flame retardants can be present in amounts of 0.1 to 10 percent by weight, based on 100 percent by weight of the resin composition, excluding any other additives and/or fillers.

Inorganic flame retardants may also be used, for example salts of $C_{2-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complexes such as $Li_3AlF_6$, $BaSiF_6$, $KBF_4$, $K_3AlF_6$, $KAlF_4$, $K_2SiF_6$, and/or $Na_3AlF_6$ of the like. When present, inorganic flame retardant salts can be present in amounts of 0.1 to 5 percent by weight, based on 100 percent by weight of the resin composition, excluding any other additives and/or fillers.

Anti-drip agents may also be used, for example a fibril forming or non-fibril forming fluoropolymer such as polytetrafluoroethylene (PTFE). The anti-drip agent may be encapsulated by a rigid copolymer as described above, for example styrene-acrylonitrile copolymer (SAN). PTFE encapsulated in SAN is known as TSAN. Encapsulated fluoropolymers may be made by polymerizing the encapsulating polymer in the presence of the fluoropolymer, for example an aqueous dispersion. TSAN may provide significant advantages over PTFE, in that TSAN may be more readily dispersed in the composition. A suitable TSAN may comprise, for example, 50 wt % PTFE and 50 wt % SAN, based on the total weight of the encapsulated fluoropolymer. The SAN may comprise, for example, 75 wt % styrene and 25 wt % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. Antidrip agents can be used in amounts of 0.1 to 5 percent by weight, based on 100 percent by weight of the resin composition, excluding any other additives and/or fillers.

Radiation stabilizers may also be present, specifically gamma-radiation stabilizers. Suitable gamma-radiation stabilizers include diols, such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; alicyclic alcohols such as 1,2-cyclopentanediol, 1,2-cyclohexanediol, and the like; branched acyclic diols such as 2,3-dimethyl-2,3-butanediol (pinacol), and the like, and polyols, as well as alkoxy-substituted cyclic or acyclic alkanes. Alkenols, with sites of unsaturation, are also a useful class of alcohols, examples of which include 4-methyl-4-penten-2-ol, 3-methyl-pentene-3-ol, 2-methyl-4-penten-2-ol, 2,4-dimethyl-4-pene-2-ol, and 9-decen-1-ol. Another class of suitable alcohols is the tertiary alcohols, which have at least one hydroxy substituted tertiary carbon. Examples of these include 2-methyl-2,4-pentanediol (hexylene glycol), 2-phenyl-2-butanol, 3-hydroxy-3-methyl-2-butanone, 2-phenyl-2-butanol, and the like, and cycoloaliphatic tertiary carbons such as 1-hydroxy-1-methyl-cyclohexane. Another class of suitable alcohols is hydroxymethyl aromatics, which have hydroxy substitution on a saturated carbon attached to an unsaturated carbon in an aromatic ring. The hydroxy substituted saturated carbon may be a methylol group ($-CH_2OH$) or it may be a member of a more complex hydrocarbon group such as would be the case with ($-CR^4HOH$) or ($-CR^4_2{}^4OH$) wherein $R^4$ is a complex or a simple hydrocarbon. Specific hydroxy methyl aromatics may be benzhydrol, 1,3-benzenedimethanol, benzyl alcohol, 4-benzyloxy benzyl alcohol and benzyl benzyl alcohol. Specific alcohols are 2-methyl-2,4-pentanediol (also known as hexylene glycol), polyethylene glycol, and polypropylene glycol. Gamma-radiation stabilizing compounds are typically used in amounts of 0.001 to 1 wt %, more specifically 0.01 to 0.5 wt %, based on the resin composition, excluding any other additives and/or fillers.

In one embodiment, the thermoplastic composition comprises a resin composition comprising 60 to 94 wt % of the polycarbonate; 5 to 20 wt % of polysiloxane-polycarbonate; and 1 to 20 wt % of gel-type low gloss additive. In another embodiment, the thermoplastic composition comprises a resin composition comprising 65 to 93 wt % polycarbonate, 5 to 15 wt % polysiloxane-polycarbonate; and 2 to 10 wt % of gel-type low gloss additive. In another embodiment, the thermoplastic composition comprises a resin composition comprising 78 to 91 wt % polycarbonate resin; 6 to 15 wt % polysiloxane-polycarbonate; and 3 to 7 wt % of gel-type low gloss additive. In another embodiment, the thermoplastic composition comprises a resin composition comprising 83 to 90 wt % polycarbonate resin; 7 to 10 wt % polysiloxane-polycarbonate; and 3 to 7 wt % of gel-type low gloss additive. Each of the foregoing wt % values are based on the combined weights of the polycarbonate, the polysiloxane-polycarbonate, and the gel-type low gloss additive, wherein the sum of the weight percentages of polycarbonate, polysiloxane-polycarbonate, and gel-type low gloss additive is 100 wt %. In a specific embodiment, the thermoplastic composition further comprises an impact modifier, filler, antioxidant, heat stabilizer, light stabilizer, ultraviolet light absorber, plasticizer, mold release agent, lubricant, antistatic agent, pigment, dye, flame retardant, anti-drip agent, or a combination comprising one or more of these.

The thermoplastic composition may be manufactured by methods generally available in the art, for example, in one embodiment, in one manner of proceeding, powdered polycarbonate, polysiloxane-polycarbonate, gel-type low gloss additive, and/or other optional components are first blended, in a HENSCHEL-Mixer® high speed mixer. Other low shear processes including but not limited to hand mixing may also accomplish this blending. The blend is then fed into the throat of an extruder via a hopper. Alternatively, one or more of the components may be incorporated into the composition by feeding directly into the extruder at the throat and/or downstream through a sidestuffer. Additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

In a specific embodiment, a method of preparing a thermoplastic composition comprises melt combining a polyepoxide, an ethylenically unsaturated nitrile containing copolymer, and an epoxide ring-opening catalyst to form the gel-type low gloss additive as a reaction product of the foregoing. The reaction product can be melt combined with a first polycarbonate to form a gel-type low gloss additive. A second polycarbonate, a polysiloxane-polycarbonate, and the gel-type low gloss additive are melt combined to form a resin composition. The melt combining can be done by extrusion.

In a specific embodiment, the extruder is a twin-screw extruder. The extruder is typically operated at a temperature of 180 to 385° C., specifically 200 to 330° C., more specifically 220 to 300° C., wherein the die temperature may be different. The extruded thermoplastic composition is quenched in water and pelletized.

Shaped, formed, or molded articles comprising the thermoplastic compositions are also provided. The thermoplastic compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, and automobile components such as molded interior panels, fenders, decorative trim, bumpers, and the like.

The thermoplastic composition is further illustrated by the following non-limiting examples, prepared using the components shown in Table 1.

TABLE 1

| | | |
|---|---|---|
| BPA-PC 22K | Bisphenol A polycarbonate resin made by a melt process with an Mw of 22,000 | GE Plastics |
| BPA-PC 30K | BPA polycarbonate resin made by a melt process with an Mw of 30,000 | GE Plastics |

TABLE 1-continued

| | | |
|---|---|---|
| PC-Siloxane | Polydimethylsiloxane - bisphenol A polycarbonate copolymer (i.e. polysiloxane-polycarbonate), ca. 20 wt % polydimethylsiloxane content, Mw 20,000 | GE Plastics |
| Gel-type low gloss additive | Extruded combination comprising the reaction product of: 64 wt % of an SAN copolymer having 75 wt % styrene/25 wt % acrylonitrile, Mw 70,000 32 wt % bisphenol A polycarbonate, Mw 40,000 4 wt % 3,4-epoxycyclohexyl-3,4-epoxycyclohexane carboxylate 1,350 ppm dodecylbenzene sulfonic acid | GE Plastics |
| Bulk ABS | 50 wt % polybutadiene content acrylonitrile-butadiene-styrene terpolymer (ABS) | GE Plastics |
| MBS | Paraloid ™ EXL-2691 (methyl methacrylate-butadiene-styrene terpolymer) | Rohm and Haas |
| AO168 | AO168 Antioxidant (Tris (2,6 di tert-butylphenyl)phosphite) | HuMeng |
| PETS | Pentaerythritol tetrastearate (plasticizer/mold release agent) | FACI SPA |
| Coated TiO$_2$ K2233 | Coated TiO$_2$ K2233 Pigment | Kronos |
| Disperse Yellow 201 | Disperse Yellow 201 Pigment | BASF |
| Macrolex Violet B | Macrolex ™ Violet B Pigment | BASF |
| Macrolex Green 5B | Macrolex ™ Green 5B Pigment | BASF |
| Heliogen Blue K7100 | Heliogen ™ Blue K7100 Copper Phthalocyanine Pigment | BASF |
| CARBON BLACK M800 | Monarch ™ M800 Carbon Black (Pigment) | Cabot Corporation |

All compositions except where indicated were compounded on a 37 mm Toshiba co-rotating twin screw extruder (Length/Diameter (L/D) ratio=40/1, vacuum port located near die face). The twin-screw extruder had sufficient distributive and dispersive mixing elements to produce good mixing between the polymer compositions. The compositions were subsequently molded using a FANUC 2000i-200A injection molding machine. Compositions were compounded and molded at a temperature of 220 to 330° C., though it will be recognized by one skilled in the art that the method may not be limited to these temperatures.

Melt volume rate (MVR) was determined at 300° C. using a 1.2-kilogram weight, over 10 minutes, in accordance with ASTM D1238. Heat deformation temperature (HDT) was determined on one-eighth inch (3.12 mm) bars according to the method of ASTM D648. Notched Izod Impact strength (NI) and percent ductility were determined on one-eighth inch (3.12 mm) bars per ASTM D256 at temperatures of 23°, 0° C., and −20° C., and is reported in units of Joules per meter. Surface gloss was tested according to ASTM D2457 at 60° using a Garden Gloss Meter and 3 millimeter color chips and is reported in gloss units (GU) with the gloss level of standard black glass chip as 100 GU. Tensile strength was determined according to ASTM D638, and is reported in megapascals (MPa). Flexural modulus was determined according to ASTM D790, and is reported in megapascals (MPa). Dynatup impact testing was determined according to ASTM D3763, and is reported in units of Joules. Hardness was determined according to ASTM D785, and is reported in megapascals (MPa).

Color capability was performed using a ColorEye™ 7000A spectrophotometer manufactured by Gretagmacbeth. The CIE (L, a, b) value was determined on 3.2 mm color chips under reflectance mode according to ASTM 6290, and calibrated using a high gloss polycarbonate standard at a white pigment (TiO$_2$) loading of 5 wt %. The color capability was determined from the absorbance spectral data according to the CEELAB color measurement method detailed by CIE (Commission Internationale de l'Eclairage). The values of E*, L*, a* and b* are reported for the Example tested.

The gel-type low gloss additive is prepared by extruding the SAN copolymer, polycarbonate, polyepoxide, and acid catalyst in the amounts shown in Table 1, above. All components were added to the feedthroat of the twin screw extruder, except that only an initial portion comprising 20 to 60 weight percent of the polycarbonate was added with these components. The remaining polycarbonate was added downstream to a feedport at about the halfway point of the extruder. The gel-type low gloss additive was extruded at a temperature of 220 to 300° C., quenched, and pelletized.

Comparative Examples 1-14, and Examples 1-12 were prepared by extrusion as described above, using the component proportions respectively given in Tables 2 and 3, below.

TABLE 2*

| Materials | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 | Comp. Ex. 12 | Camp. Ex. 13 | Comp. Ex. 14 |
|---|---|---|---|---|---|---|---|---|---|---|---|---|---|---|
| BPA-PC 22K | 57.00 | 57.00 | 57.00 | 57.00 | 57.00 | 57.00 | 57.00 | 57.00 | 57.00 | 57.00 | 57.00 | 57.00 | 57.00 | 57.00 |
| BPA-PC 30K | 38.00 | 33.00 | 28.00 | 23.00 | 18.00 | 8.00 | 38.00 | 38.00 | 38.00 | 38.00 | 38.00 | 38.00 | 38.00 | 38.00 |

TABLE 2*-continued

| Materials | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 | Comp. Ex. 12 | Comp. Ex. 13 | Comp. Ex. 14 |
|---|---|---|---|---|---|---|---|---|---|---|---|---|---|---|
| Low gloss additive | — | — | — | — | — | — | 5.00 | 5.00 | 5.00 | 5.00 | 5.00 | 5.00 | 5.00 | 5.00 |
| Bulk ABS | — | — | — | — | — | — | — | — | 5.00 | 9.00 | 13.00 | — | — | — |
| MBS | — | — | — | — | — | — | — | — | — | — | — | — | 2.00 | 4.00 |
| PC-Siloxane | — | 5.00 | 10.00 | 15.00 | 20.00 | 30.00 | — | — | — | — | — | — | — | — |
| AO1076 | 0.30 | 0.30 | 0.30 | 0.30 | 0.30 | 0.30 | 0.30 | — | — | — | — | — | — | — |
| PETS | 0.15 | 0.15 | 0.15 | 0.15 | 0.15 | 0.15 | 0.15 | — | — | — | — | — | — | — |
| coated $TiO_2$ K2233 | 1.00 | 1.00 | 1.00 | 1.00 | 1.00 | 1.00 | 1.00 | — | — | — | — | — | — | — |

TABLE 3*

| Materials | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| BPA-PC 22K | 57.00 | 57.00 | 57.00 | 57.00 | 57.00 | 69.04 | 69.04 | 69.04 | 69.04 | 69.04 | 69.04 | 69.04 |
| BPA-PC 30K | 33.00 | 28.00 | 23.00 | 18.00 | 8.00 | 18.41 | 18.41 | 18.41 | 18.41 | 18.41 | 18.41 | 18.41 |
| Low gloss additive | 5.00 | 5.00 | 5.00 | 5.00 | 5.00 | 4.60 | 4.60 | 4.60 | 4.60 | 4.60 | 4.60 | 4.60 |
| PC-Siloxane | 5.00 | 10.00 | 15.00 | 20.00 | 30.00 | 7.36 | 7.36 | 7.36 | 7.36 | 7.36 | 7.36 | 7.36 |
| AO1076 | 0.30 | 0.30 | 0.30 | 0.30 | 0.30 | 0.25 | 0.25 | 0.25 | 0.25 | 0.25 | 0.25 | 0.25 |
| PETS | 0.15 | 0.15 | 0.15 | 0.15 | 0.15 | 0.09 | 0.09 | 0.09 | 0.09 | 0.09 | 0.09 | 0.09 |
| Coated $TiO_2$ K2233 | 1.00 | 1.00 | 1.00 | 1.00 | 1.00 | — | — | — | — | — | — | 3.00 |
| Disperse Yellow 201 | — | — | — | — | — | — | 0.50 | — | — | — | — | — |
| Macrolex Violet B | — | — | — | — | — | — | — | 0.50 | — | — | — | — |
| Macrolex Green 5B | — | — | — | — | — | — | — | — | 0.50 | — | — | — |
| Heliogen Blue K7100 | — | — | — | — | — | — | — | — | — | 0.50 | — | — |
| Carbon Black M800 | — | — | — | — | — | — | — | — | — | — | 1.00 | — |

*Note: All values are given in weight percent, wherein the sum of BPA-PC, low gloss additive, and PC-siloxane is 100 wt %.

The properties of the thermoplastic compositions prepared according to Comparative Examples 1-14 and Examples 1-12 are given in Tables 4 and 5 respectively, below.

TABLE 4

| Properties | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| MVR at 1.2 Kg 300° C. (cc/10 min.) | 14.80 | 13.60 | 13.10 | 11.00 | 10.50 | 9.50 | 13.70 |
| Gloss (at 60°) | 103.96 | 103.96 | 103.34 | 103.12 | 102.70 | 101.98 | 41.36 |
| Flexural Modulus (MPa) | 2,300 | 2,220 | 2,160 | 2,130 | 2,080 | 2,000 | 2,350 |
| Tensile Strength (MPa) | 60.2 | 59.0 | 57.4 | 56.0 | 54.7 | 52.2 | 62.0 |
| Tensile Elongation (%) | 112 | 118 | 130 | 130 | 118 | 110 | 118 |
| HDT (° C.) | 131 | 130 | 129 | 130 | 128 | 128 | 129 |
| Izod impact 23° C. (J/m) | 856 | 856 | 912 | 905 | 880 | 872 | 173 |
| Ductility 23° C. (%) | 100 | 100 | 100 | 100 | 100 | 100 | 0 |
| Izod impact at 0° C. (J/m) | 800 | 838 | 872 | 851 | 820 | 792 | 142 |
| Ductility 0° C. (%) | 100 | 100 | 100 | 100 | 100 | 100 | 0 |

TABLE 4-continued

| | | | | | | | |
|---|---|---|---|---|---|---|---|
| Izod impact −20° C. (J/m) | 134 | 344 | 746 | 796 | 766 | 766 | 122 |
| Ductility −20° C. (%) | 0 | 0 | 100 | 100 | 100 | 100 | 0 |
| Dynatup (in Joules) | 69.0 | 73.5 | 72.2 | 63.3 | 73.4 | 48.8 | 61.9 |
| Ductility (%) | 100 | 100 | 100 | 100 | 100 | 100 | 100 |
| Hardness (MPa) | 93.36 | 91.84 | 89.4 | 88.98 | 84.88 | 78.56 | 96.62 |

| Properties | Comp. Ex. 8 | Comp. Ex. 9 | Comp. Ex. 10 | Comp. Ex. 11 | Comp. Ex. 12 | Comp. Ex. 13 | Comp. Ex. 14 |
|---|---|---|---|---|---|---|---|
| MVR at 1.2 Kg 300° C. (cc/10 min.) | — | — | — | — | — | — | — |
| Gloss (at 60°) | 33.00 | 46.00 | 56.00 | 63.00 | 31.00 | 36.00 | 39.00 |
| Flexural Modulus (MPa) | — | — | — | — | — | — | — |
| Tensile Strength (MPa) | — | — | — | — | — | — | — |
| Tensile Elongation (%) | — | — | — | — | — | — | — |
| HDT (° C.) | — | — | — | — | — | — | — |
| Izod impact 23° C. (J/m) | 208 | 196 | 567 | 510 | 82 | 357 | 724 |
| Ductility 23° C. (%) | 0 | 0 | 60 | 100 | — | — | — |
| Izod impact at 0° C. (J/m) | 170 | 162 | 189 | 222 | — | — | — |
| Ductility 0° C. (%) | 0 | 0 | 0 | 0 | — | — | — |
| Izod impact −20° C. (J/m) | 139 | 152 | 164 | 172 | — | — | — |
| Ductility −20° C. (%) | 0 | 0 | 0 | 0 | — | — | — |
| Dynatup (in Joules) | — | — | — | — | — | — | — |
| Ductility (%) | — | — | — | — | — | — | — |
| Hardness (MPa) | — | — | — | — | — | — | — |

TABLE 5

| Properties | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| MVR at 1.2 Kg 300° C. (cc/10 min.) | 13.40 | 13.40 | 12.50 | 11.70 | 10.80 | — | — | — | — | — | — | — |
| Gloss (at 60°) | 40.46 | 37.4 | 40.86 | 44.6 | 57.08 | 28.58 | 38.08 | 38.64 | 40.8 | 64.94 | 40.66 | 40.52 |
| Flexural Modulus (MPa) | 2280 | 2240 | 2190 | 2160 | 2080 | — | — | — | — | — | — | — |
| Tensile Strength (MPa) | 60.3 | 58.9 | 57.4 | 56.1 | 53.8 | — | — | — | — | — | — | — |
| Tensile Elongation (%) | 124 | 126 | 126 | 122 | 111 | — | — | — | — | — | — | — |
| HDT (° C.) | 128 | 128 | 127 | 127 | 125 | — | — | — | — | — | — | — |
| Izod impact 23° C. (J/m) | 910 | 937 | 915 | 888 | 856 | 853 | 822 | 816 | 820 | 740 | 841 | 824 |
| Ductility 23° C. (%) | 100 | 100 | 100 | 100 | 100 | 100 | 100 | 100 | 100 | 100 | 100 | 100 |
| Izod impact at 0° C. (J/m) | 646 | 804 | 832 | 822 | 785 | — | — | — | — | — | — | — |
| Ductility 0° C. (%) | 80 | 100 | 100 | 100 | 100 | — | — | — | — | — | — | — |

TABLE 5-continued

| Properties | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Izod impact −20° C. (J/m) | 180 | 242 | 474 | 684 | 690 | — | — | — | — | — | — | — |
| Ductility −20° C. (%) | 0 | 0 | 0 | 100 | 100 | — | — | — | — | — | — | — |
| Dynatup (in Joules) | 72.4 | 68.7 | 62.1 | 62.3 | 57.7 | 71.1 | 68.9 | 70.1 | 70 | 65 | 64.4 | 55.5 |
| Ductility (%) | 100 | 100 | 100 | 100 | 100 | 100 | 100 | 100 | 100 | 100 | 100 | 100 |
| Hardness (MPa) | 93.44 | 91.54 | 88.14 | 85.38 | 82.96 | — | — | — | — | — | — | — |

As seen in the above data, where the polysiloxane-polycarbonate is present without the gel-type low gloss additive (Table 4, Comparative Examples 1-6), the gloss level is greater than 100 GU. Gloss is less than about 45 GU with 5 wt % of gel-type low gloss additive present (Table 4, Comp. Ex. 7, and Table 5, Examples 1-4), except where the highest loadings at 30 wt % of PC-siloxane are used (Table 5, Example 5), in which case the gloss increases to about 57 GU. A baseline gloss of about 29 GU is achieved for Example 6 (without colorant), which has a PC-siloxane loading of 7.36 wt %.

Notched Izod impact strength is dramatically improved at all temperatures by addition of PC-siloxane (Table 4, Comparative Examples 2-6, and Table 5, Examnples 1-5), particularly at −20° C., with the addition of the PC-siloxane at levels of 10 wt % or greater, wherein higher loadings of the PC-siloxane show better NII performance and ductility. Other parameters including melt flow rate (MVR), flexural modulus, tensile strength, tensile elongation, heat distortion temperature (HDT), Dynatup, and hardness each show small decreases in these properties with increasing loading of the PC-siloxane, in the presence of the gel-type low gloss additive.

FIG. 1 is a comparison plot showing the 60 degree gloss results versus PC-siloxane loading for Comparative Examples 1-6 (labeled as having no gel-type low gloss additive present) and for Comparative Example 7 and Examples 1-5 (labeled as having gel-type low gloss additive, present at 5 wt %). The plot affirms, in the absence of gel-type low gloss additive, that there is minimal effect on gloss with increasing PC-siloxane loading. A non-linearity in the gloss results with increasing PC-siloxane loading can be seen for loadings of 0 to 15 wt % PC-siloxane. With gel-type low gloss additive and pigment present, compositions with increasing amounts of PC-siloxane exhibit a gloss minimum of about 37 GU at loading of PC-siloxane of about 8 to 10 wt %.

Figure 2:
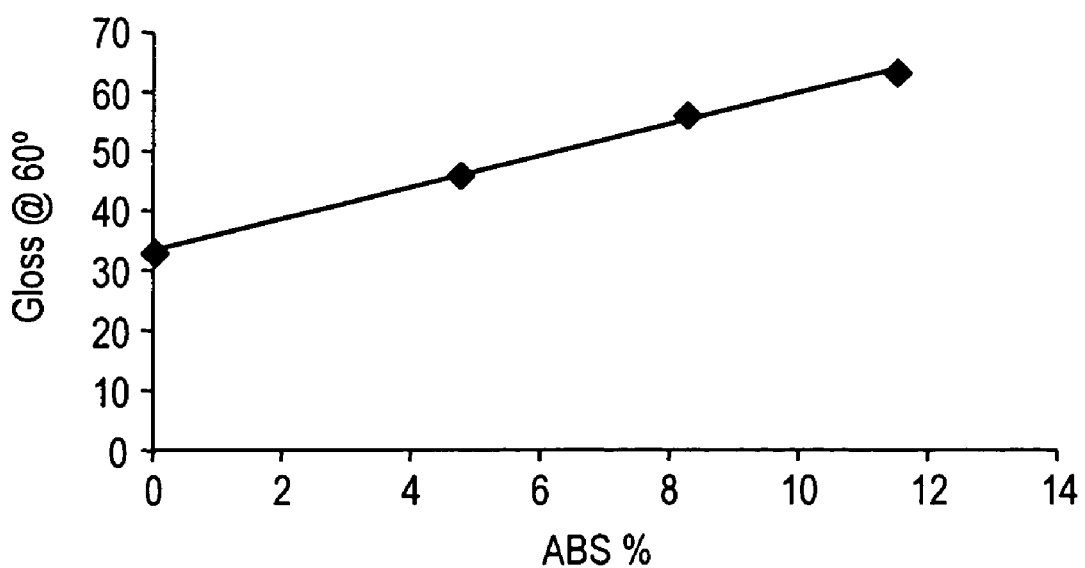
FIG. 2 is a comparative plot of gloss measured at 60° versus loading of acrylonitrile-styrene-butadiene (ABS) terpolymer.
Figure 3:
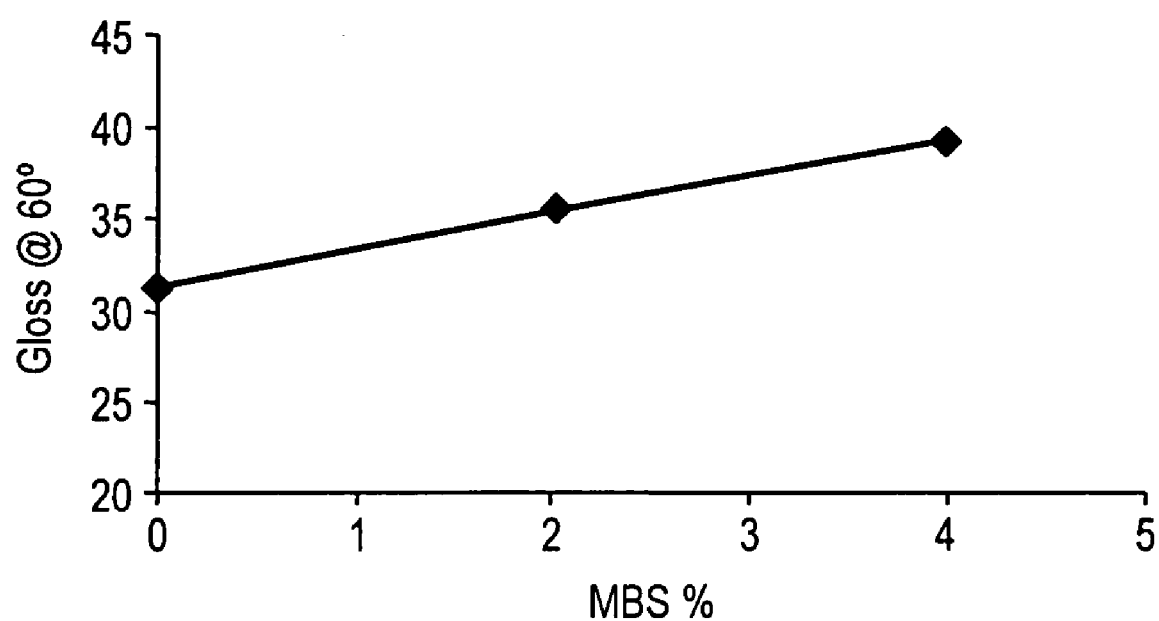
FIG. 3 is a comparative plot of gloss measured at 60° versus loading of methyl methacrylate-styrene-butadiene (MBS) terpolymer.

For comparison with the data shown in FIG. 1, increasing loading of impact modifiers acrylonitrile-butadiene-styrene terpolymer (ABS; Comparative Examples 8-11, shown in FIG. 2) and methacrylate-butadiene-styrene terpolymer (MBS; Comparative Examples 12-14, shown in FIG. 3), show the gloss increasing linearly with increasing loading of impact modifier. The advantages of using PC-siloxane over other impact modifiers with respect to maintaining a constant level of gloss across loadings of PC-siloxane will be readily appreciated in light of this comparison.

The color capability of Example 2 was tested against a super white standard, prepared at the same $TiO_2$ pigment loading from a high gloss bisphenol A polycarbonate. The data are shown in Table 6, below.

TABLE 6

| Description | Example 2 |
|---|---|
| ΔL* vs. standard | 0.18 |
| Δa* vs. standard | −0.25 |
| Δb* vs. standard | 0.09 |
| ΔE* vs. standard | 0.32 |

The color capability for each of the parameters is within ±0.5 units for each parameter, with the greatest single deviation of −0.25 toward green seen in the green/red color axis (Δa*), and the overall deviation value ΔE* of 0.32. The color is therefore adjustable to achieve color performance (in this instance, super white color performance) without extensive modification of the formula of the thermoplastic composition.

The singular forms "a," "an," and "the" include plural referents unless the context clearly dictates otherwise. The endpoints of all ranges reciting the same characteristic or component are independently combinable and inclusive of the recited endpoint. All references are incorporated herein by reference. Further, it should be noted that the terms "first," "second," and the like herein do not denote any order, quantity, or importance, but rather are used to distinguish one element from another.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

What is claimed is:

1. A thermoplastic composition comprising a resin composition comprising:
   60 to 94 weight percent of a polycarbonate,
   5 to 20 weight percent of a polysiloxane-polycarbonate, and
   1 to 20 weight percent of a gel-type low gloss additive that comprises the reaction product of a polyepoxide and an ethylenically unsaturated nitrile containing copolymer, each based on the combined weights of the polycarbonate, polysiloxane-polycarbonate, and gel-type low gloss additive,
   wherein the amount of polysiloxane as provided by the polysiloxane-polycarbonate comprises 1 to 4 weight percent of the total weight of the resin composition, and wherein the 60° gloss of the thermoplastic composition is measured to be less than or equal to 90 GU on 3 millimeter color chips according to ASTM D2457.

2. The thermoplastic composition of claim 1 wherein the polycarbonate is present in the resin composition in an amount of 65 to 93 weight percent of the combined weights of the polycarbonate, polysiloxane-polycarbonate, and gel-type low gloss additive.

3. The thermoplastic composition of claim 2 wherein the polycarbonate comprises bisphenol A polycarbonate having a weight averaged molecular weight of 10,000 to 50,000, as measured by gel permeation chromatography.

4. An article comprising the thermoplastic composition of claim 1.

5. The thermoplastic composition of claim 1, wherein the polysiloxane-polycarbonate comprises 1 to 50 weight percent polysiloxane.

6. The thermoplastic composition of claim 5 wherein the polysiloxane-polycarbonate comprises polydimethylsiloxane units and bisphenol-A carbonate units.

7. The thermoplastic composition of claim 5, wherein the amount of polysiloxane as provided by the polysiloxane-polycarbonate comprises 1 to 3 weight percent of the total weight of the resin composition.

8. The thermoplastic composition of claim 1, wherein the color capability of the thermoplastic composition determined spectrophotometrically by the method of CIELAB, has a deviation value $\Delta E^*_{ab}$ of less than or equal to 0.5.

9. The thermoplastic composition of claim 1 wherein the polyepoxide is an alicyclic polyepoxide.

10. The thermoplastic composition of claim 9 wherein the alicyclic polyepoxide is 3,4-epoxycyclohexyl 3,4-epoxycyclohexylcarboxylate.

11. The thermoplastic composition of claim 1 wherein the ethylenically unsaturated nitrile containing copolymer comprises styrene and acrylonitrile.

12. The thermoplastic composition of claim 1 wherein the gel-type low gloss additive further comprises a polycarbonate.

13. The thermoplastic composition of claim 1 additionally comprising an impact modifier, filler, antioxidant, heat stabilizer, light stabilizer, ultraviolet light absorber, plasticizer, mold release agent, lubricant, antistatic agent, colorant, flame retardant, anti-drip agent, or a combination comprising one or more of these.

14. The thermoplastic composition of claim 13 wherein the colorant is present in an amount of 0.01 to 10 weight percent of the combined weights of the polycarbonate, polysiloxane-polycarbonate, and gel-type low gloss additive.

15. A method of preparing a thermoplastic composition comprising melt-combining:
60 to 94 weight percent of a first polycarbonate,
5 to 20 weight percent of a polysiloxane-polycarbonate, and
1 to 20 weight percent a gel-type low gloss additive that comprises the reaction product of a polyepoxide and an ethylenically unsaturated nitrile containing copolymer, each based on the combined weights of the polycarbonate, polysiloxane-polycarbonate, and gel-type low gloss additive,
wherein the amount of polysiloxane as provided by the polysiloxane-polycarbonate comprises 1 to 4 weight percent of the total weight of the resin composition,
wherein the melt combining is done at a temperature of 220 to 300° C., and wherein the thermoplastic composition so prepared has a 60° gloss measured to be less than or equal to 90 GU on 3 millimeter color chips according to ASTM D2457.

16. The method of claim 15 wherein the gel-type low gloss additive is prepared by melt combining
a polyepoxide,
an ethylenically unsaturated nitrile containing copolymer, and
an epoxide ring-opening catalyst
at a temperature of 220 to 300° C. to form a reaction product, and melt combining the reaction product with a second polycarbonate at a temperature of up to 350° C., wherein the melt combining is done by extrusion.

17. The method of claim 16 wherein the thermoplastic composition comprises 65 to 93 weight percent of the first polycarbonate, 5 to 15 weight percent of the polysiloxane-polycarbonate, and 1 to 20 weight percent of the gel-type low gloss additive, and wherein the sum of the weight percentages of polycarbonate, polysiloxane-polycarbonate, and gel-type low gloss additive is 100 weight percent.

18. A thermoplastic composition prepared by the method of claim 15.

19. A thermoplastic composition comprising a resin composition consisting of:
60 to 94 weight percent of a polycarbonate,
5 to 20 weight percent of a polysiloxane-polycarbonate, and
1 to 20 weight percent of a gel-type low gloss additive, each based on the combined weights of the polycarbonate, polysiloxane-polycarbonate, and gel-type low gloss additive, wherein the gel-type low gloss additive comprises the reaction product of
a polyepoxide and
an ethylenically unsaturated nitrile containing copolymer,
wherein the amount of polysiloxane as provided by the polysiloxane-polycarbonate comprises 1 to 4 weight percent of the total weight of the resin composition, and wherein the 60° gloss of the thermoplastic composition is measured to be less than or equal to 90 GU on 3 millimeter color chips according to ASTM D2457.

20. A method of preparing a thermoplastic composition comprising melt combining
a polyepoxide,
an ethylenically unsaturated nitrile containing copolymer, and
an epoxide ring-opening catalyst to form a reaction product;
melt combining the reaction product with a first polycarbonate to form a gel-type low gloss additive; and melt combining
60 to 94 weight percent of a second polycarbonate,
5 to 20 weight percent of a polysiloxane-polycarbonate, and
1 to 20 weight percent of the gel-type low gloss additive, each based on the combined weights of the second polycarbonate, polysiloxane-polycarbonate, and gel-type low gloss additive,
wherein the amount of polysiloxane as provided by the polysiloxane-polycarbonate comprises 1 to 4 weight percent of the total weight of the resin composition, wherein the melt combining is done by extrusion, and wherein the thermoplastic composition has a 60° gloss measured to be less than or equal to 90 GU on 3 millimeter color chips according to ASTM D2457.

21. A thermoplastic composition comprising a resin composition consisting of:

83 to 93 weight percent of a polycarbonate, 5 to 10 weight percent of a polysiloxane-polycarbonate, and 2 to 7 weight percent of a gel-type low gloss additive that comprises the reaction product of a polyepoxide and an ethylenically unsaturated nitrile containing copolymer, each based on the combined weights of the polycarbonate, polysiloxane-polycarbonate, and gel-type low gloss additive, wherein the polysiloxane content of the resin composition as provided by the polysiloxane-polycarbonate is 1 to 4 weight percent of the total weight of the resin composition, and wherein the 60° gloss of the thermoplastic composition is measured to be less than or equal to 90 GU on 3 millimeter color chips according to ASTM D2457.

* * * * *